US012701338B2

(12) United States Patent
Nasu

(10) Patent No.: US 12,701,338 B2
(45) Date of Patent: Aug. 4, 2026

(54) ANALOG-TO-DIGITAL CONVERTER, SENSOR AND APPARATUS

(71) Applicant: CANON KABUSHIKI KAISHA, Tokyo (JP)

(72) Inventor: Hitoshi Nasu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 18/473,040

(22) Filed: Sep. 22, 2023

(65) Prior Publication Data

US 2024/0107190 A1      Mar. 28, 2024

(30) Foreign Application Priority Data

Sep. 26, 2022    (JP) ................................. 2022-152806

(51) Int. Cl.
*H04N 25/60*         (2023.01)
*H04N 23/667*        (2023.01)
*H04N 25/76*         (2023.01)
*H04N 25/78*         (2023.01)

(52) U.S. Cl.
CPC ......... *H04N 25/60* (2023.01); *H04N 25/7795* (2023.01); *H04N 25/78* (2023.01); *H04N 23/667* (2023.01)

(58) Field of Classification Search
CPC .... H04N 25/78; H04N 25/60; H04N 25/7795; H04N 23/667; H03M 3/396; H03M 3/458
See application file for complete search history.

(56) References Cited

U.S. PATENT DOCUMENTS

| | | | |
|---|---|---|---|
| 11,431,939 B1* | 8/2022 | Fan ...................... | H04N 25/617 |
| 2011/0069211 A1* | 3/2011 | Jung ....................... | H03M 3/48 |
| | | | 348/294 |
| 2022/0272285 A1* | 8/2022 | Rizk ...................... | H04N 25/78 |

FOREIGN PATENT DOCUMENTS

JP          3904111 B2     4/2007

* cited by examiner

*Primary Examiner* — Kelly L Jerabek
(74) *Attorney, Agent, or Firm* — Canon U.S.A., Inc IP Division

(57) ABSTRACT

An analog-to-digital converter comprises: an analog-to-digital conversion unit that performs analog-to-digital conversion using ΔΣ modulation on an image signal output from pixels; a setting unit that sets an operating frequency of the analog-to-digital conversion unit; and a generation unit that generates a clock signal having the operating frequency and supplies it to the analog-to-digital conversion unit. The setting unit sets the operating frequency based on at least one of a digital gain to be applied to the signal output from the analog-to-digital conversion unit and a shooting mode.

12 Claims, 7 Drawing Sheets

FIG. 1

F I G. 3
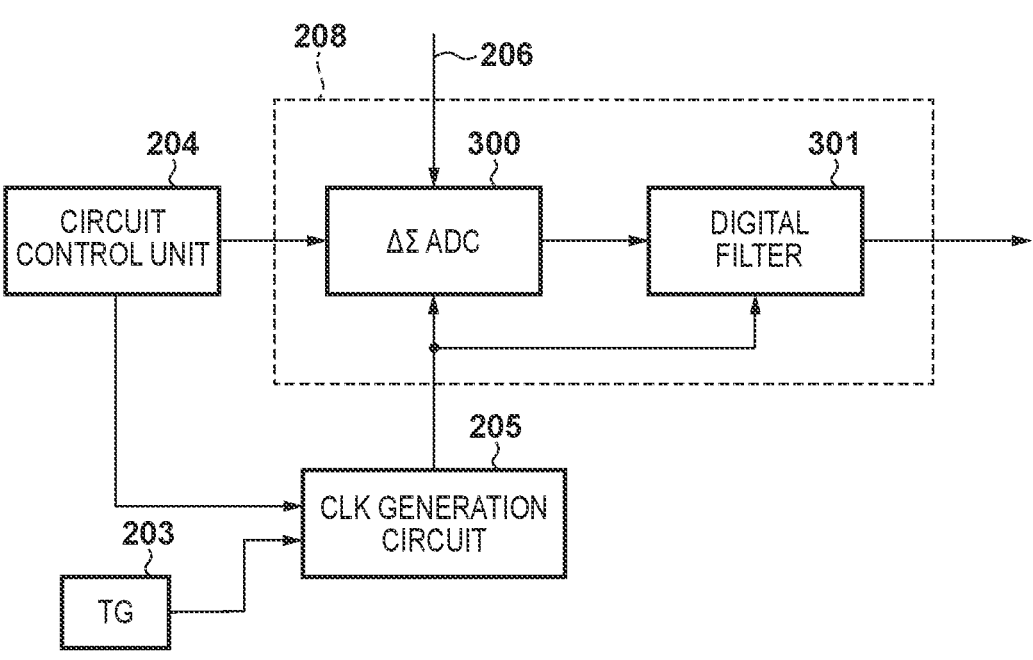
F I G. 4
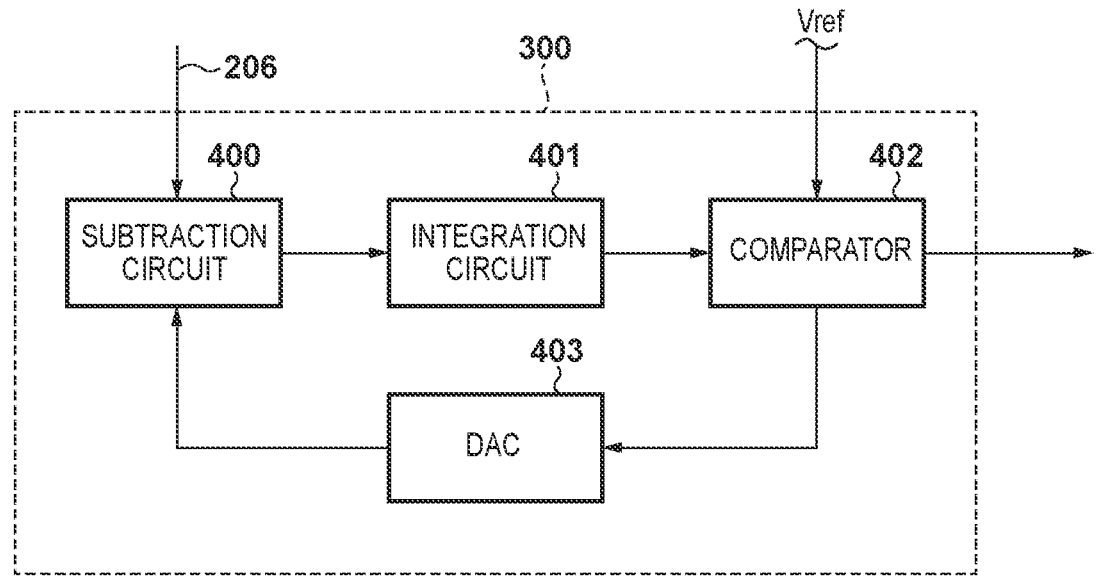

F I G. 5
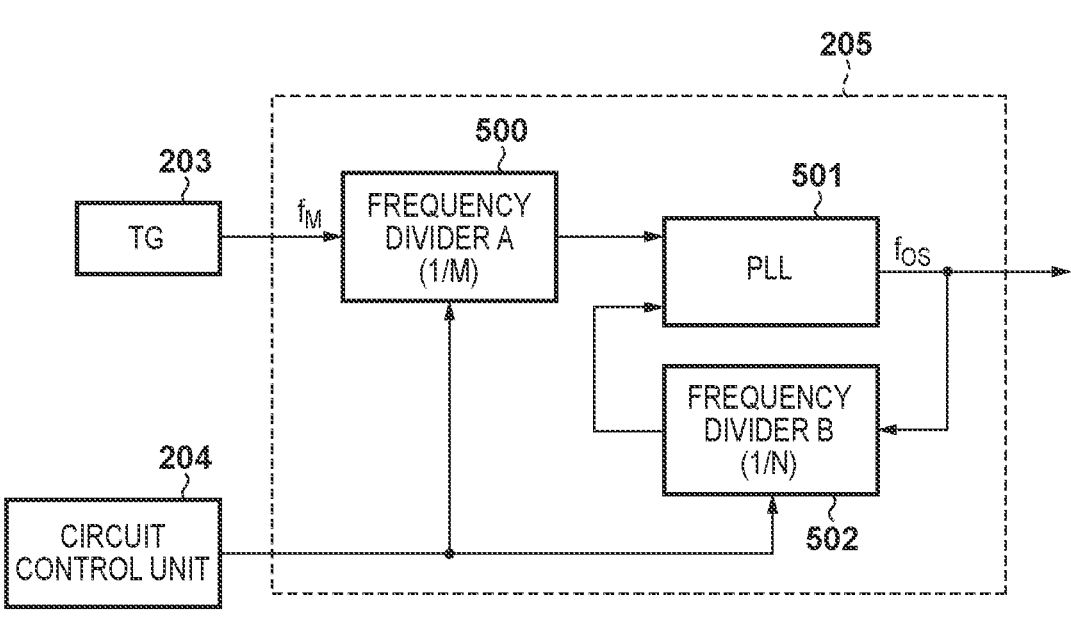

F I G. 9
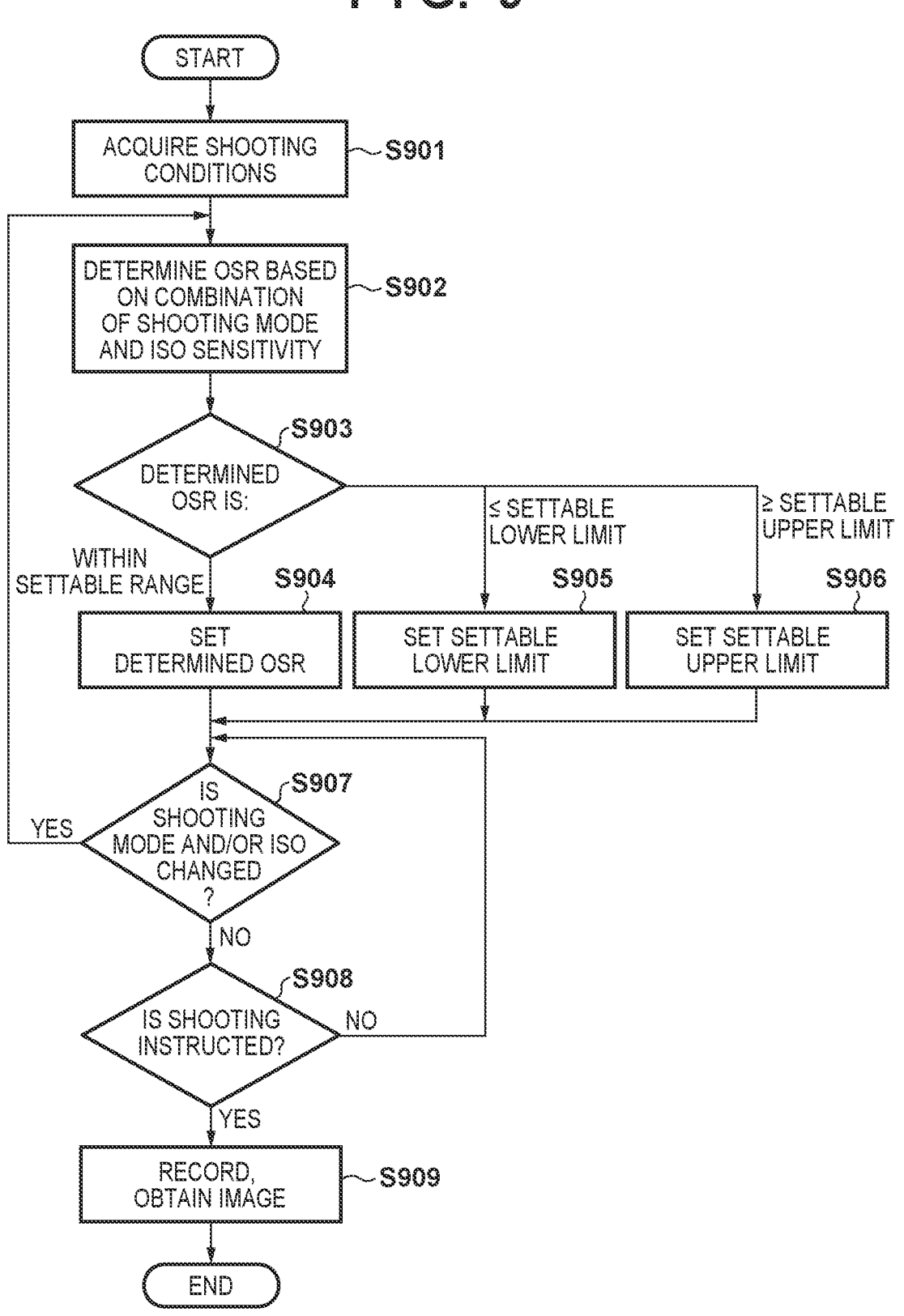

ANALOG-TO-DIGITAL CONVERTER, SENSOR AND APPARATUS

BACKGROUND

Technical Field

The aspect of the embodiments relates to an analog-to-digital converter, a sensor and apparatus using the same, and more particularly to an analog-to-digital conversion technique using ΔΣ modulation.

Description of the Related Art

In recent years, in CMOS image sensors, the number of pixels has increased and readout speed has also increased. Accordingly, by arranging and operating a large number of analog-to-digital converters (ADCs) in parallel, it is possible to increase the number of pixels and increase the readout speed. However, conventionally used slope-type ADCs have the issue of an increase in circuit scale and power consumption due to the parallel arrangement of a large number of ADCs.

Therefore, there has been proposed a CMOS image sensor using a ΔΣ ADC that is smaller in circuit scale than the slope-type ADC, requires a lower voltage in each ADC, and is capable of performing high-speed A/D conversion. For example, Japanese Patent No. 3904111 discloses a configuration of a CMOS image sensor using ΔΣ modulation in an A/D conversion circuit.

In the slope-type ADC, it is possible to apply a gain during A/D conversion by changing the slope of the reference voltage used in the conversion, but in ΔΣ ADC having a structure as shown in the Japanese Patent No. 3904111, it is not possible to apply a gain during A/D conversion. Therefore, in the ΔΣ ADC, the digital gain is applied in a signal processing unit after the A/D conversion, but as the digital gain increases, the bit precision of an output from the signal processing unit decreases.

SUMMARY

According to the aspect of the embodiments, provided is an analog-to-digital converter comprising: one or more processors and/or circuitry which function as: an analog-to-digital conversion unit that performs analog-to-digital conversion using ΔΣ modulation on an image signal output from pixels; a setting unit that sets an operating frequency of the analog-to-digital conversion unit; and a generation unit that generates a clock signal having the operating frequency and supplies it to the analog-to-digital conversion unit, wherein the setting unit sets the operating frequency based on at least one of a digital gain to be applied to the signal output from the analog-to-digital conversion unit and a shooting mode.

Further, according to the aspect of the embodiments, provided is a sensor comprising: a plurality of pixels; and an analog-to-digital converter comprising one or more processors and/or circuitry which function as: an analog-to-digital conversion unit that performs analog-to-digital conversion using ΔΣ modulation on an image signal output from the pixels; a setting unit that sets an operating frequency of the analog-to-digital conversion unit; and a generation unit that generates a clock signal having the operating frequency and supplies it to the analog-to-digital conversion unit, and wherein the setting unit sets the operating frequency based on at least one of a digital gain to be applied to the signal output from the analog-to-digital conversion unit and a shooting mode.

Furthermore, according to another aspect of the embodiments, provided is an apparatus comprising: a sensor that includes: a plurality of pixels; and an analog-to-digital converter comprising one or more processors and/or circuitry which function as: an analog-to-digital conversion unit that performs analog-to-digital conversion using ΔΣ modulation on an image signal output from the pixels; a setting unit that sets an operating frequency of the analog-to-digital conversion unit; and a generation unit that generates a clock signal having the operating frequency and supplies it to the analog-to-digital conversion unit; and a signal processing unit that processes the image signal converted by the analog-to-digital converter, wherein the setting unit sets the operating frequency based on at least one of a digital gain to be applied to the signal output from the analog-to-digital conversion unit and a shooting mode.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 1 is a block diagram showing a schematic configuration of an image capturing apparatus according to an embodiment of the disclosure;

FIG. 3 is a block diagram showing a configuration of a readout circuit according to the embodiment;

FIG. 4 is a block diagram showing a configuration of a ΔΣ ADC according to the embodiment;

FIG. 5 is a block diagram showing a configuration of a CLK generation circuit according to the embodiment;

FIG. 9 is a flowchart showing switching control of operating frequency of the ΔΣ ADC according to a third embodiment.

DESCRIPTION OF THE EMBODIMENTS

Figure 2:
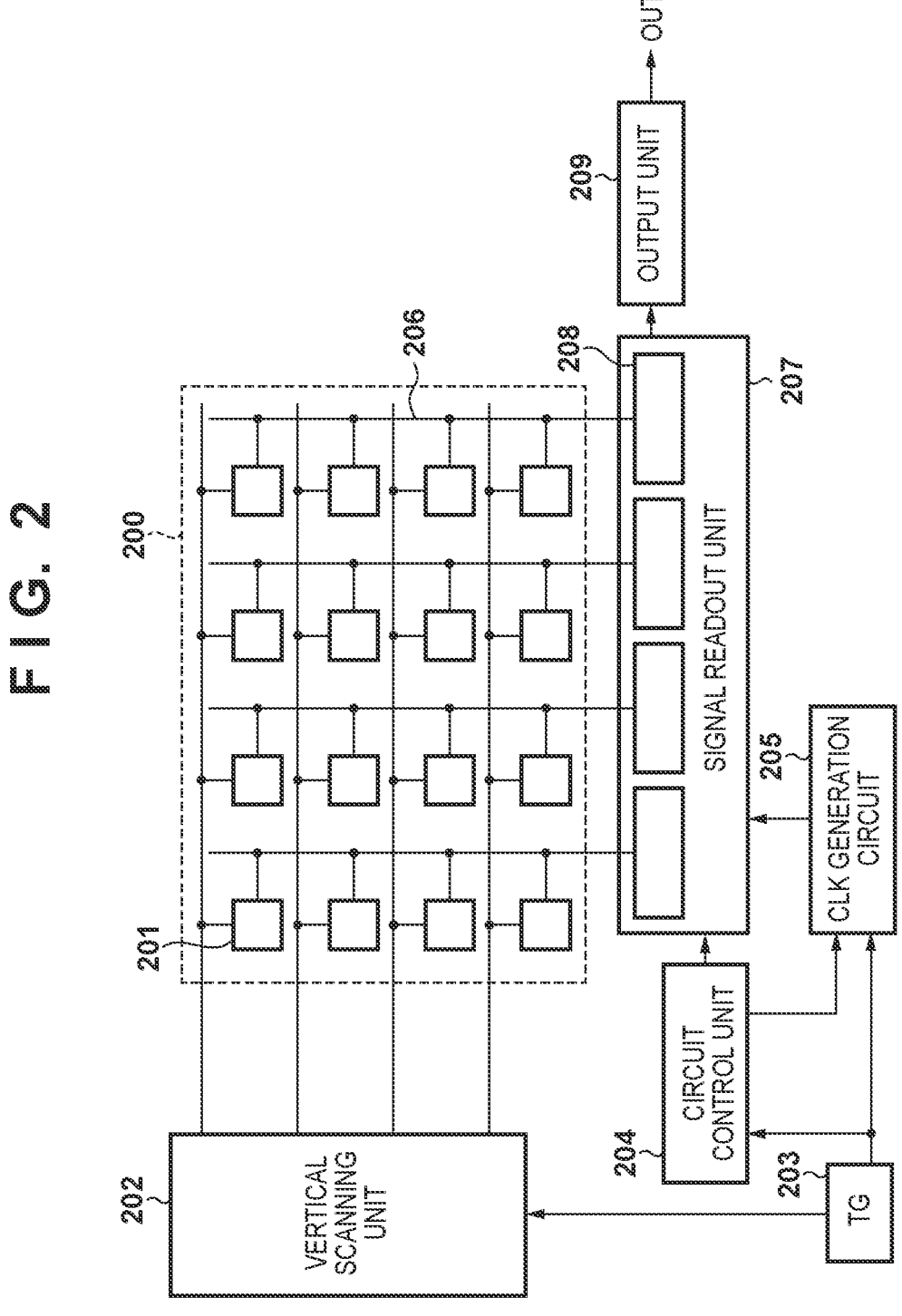
FIG. 2 is a block diagram showing a schematic configuration of an image sensor according to the embodiment.

Hereinafter, embodiments will be described in detail with reference to the attached drawings. Note, the following embodiments are not intended to limit the scope of the disclosure, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
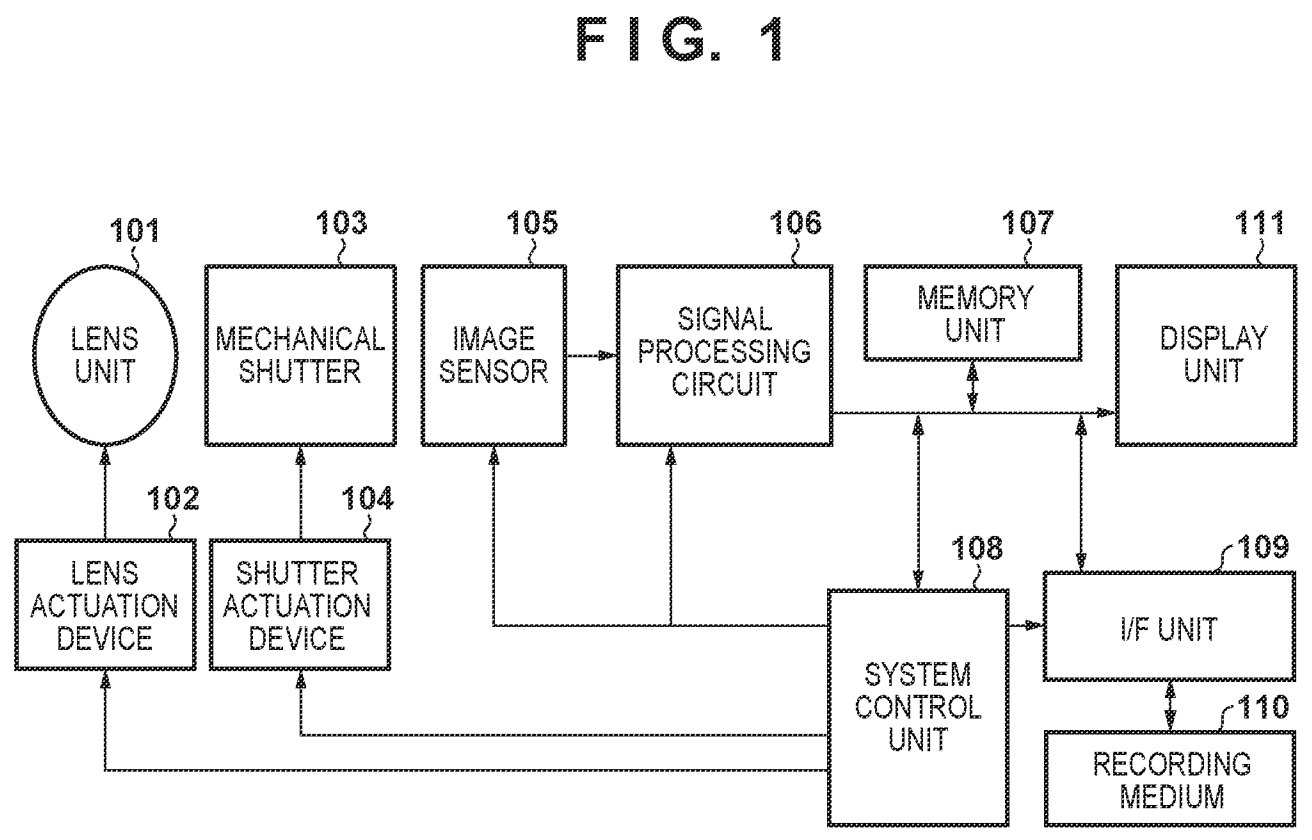

FIG. 1 is a block diagram showing a configuration of an image capturing apparatus using an image sensor according to a first embodiment of the disclosure. The image capturing apparatus to which the aspect of the embodiments can be applied may be an electronic device with a camera function, which may be a camera such as a digital camera and a digital video camera, or may be a mobile telephone equipped with a camera, a computer equipped with a camera, a game device, and so forth.

In FIG. 1, a lens unit 101 includes a plurality of lenses including a zoom lens, a focus lens, and so forth, an aperture, and the like, and zoom control, focus control, aperture control, and the like are performed by a lens actuation device 102. An optical image of a subject incident through the lens unit 101 is formed on an image sensor 105.

Note that the lens unit 101 may be configured integrally with the image capturing apparatus, or may be configured to be detachable. A mechanical shutter 103 is controlled by a shutter actuation device 104. The image sensor 105 photo-electrically converts the optical image of the subject formed by the lens unit 101 and outputs an image signal.

A signal processing circuit 106 performs digital gain processing for applying a digital gain to the image signal output from the image sensor 105, various corrections, data compression, etc., and outputs image data. A memory unit 107 is used to temporarily store the image data. A system control unit 108 performs various operations and controls the entire image capturing apparatus. An I/F unit 109 is an interface for performing recording and reading out on a recording medium 110, and the recording medium 110 is a semiconductor memory such as a flash memory for holding image data, and the like, and is detachably configured. A display unit 111 displays various information and captured images.

Next, an operation at the time of shooting in the image capturing apparatus having the above configuration will be briefly described.

When a main power supply switch (not shown) is turned on, power supply to the system control unit 108 is started, and power supply to the imaging circuits such as the signal processing circuit 106 is also started. Then, when a release button (not shown) is pushed or the like to instruct shooting, shooting operation is started. After the shooting operation is finished, an image signal output from the image sensor 105 is subjected to image processing including various corrections and digital gain processing in the signal processing circuit 106, and the obtained image data is written to the memory unit 107 in response to an instruction from the system control unit 108. The image data held in the memory unit 107 is recorded on the detachable recording medium 110 such as a semiconductor memory through the I/F unit 109 under the control of the system control unit 108.

Also, ROW image data may be sent to an external computer or the like via an external I/F unit (not shown), and image processing may be performed in the computer or the like.

FIG. 2 is a block diagram showing a schematic configuration of the image sensor 105 in this embodiment.

The image sensor 105 includes a pixel section 200, a vertical scanning unit 202, a timing generator (TG) 203, a circuit control unit 204, a CLK generation circuit 205, column output lines 206, a signal readout unit 207 and an output unit 209.

A plurality of pixels 201 are arranged in a matrix in the pixel section 200. For simplicity of explanation, the pixels 201 are shown as an array of 4×4 pixels in the pixel section 200, but in practice a large number of pixels, for example several millions or more, are arranged. The signal readout unit 207 has a plurality of readout circuits 208.

The vertical scanning unit 202 selects the pixels 201 of the pixel section 200 in units of row and supplies plural kinds of actuation signals to each pixel 201 of the selected row. As a result, the pixel signals of the pixels 201 in the selected row are output to the signal readout unit 207 via the column output lines 206. The output pixel signals are converted into digital signals in the respective readout circuits 208 and output to the outside of the image sensor 105 via the output unit 209.

The readout circuit 208 A/D-converts the input pixel signal into a digital signal of a predetermined number of bits. Here, a so-called ΔΣ A/D conversion method is used for the A/D conversion.

The output unit 209 converts the digital signal of each pixel into a predetermined signal format and outputs it to the outside of the image sensor 105 from the transmission line.

The TG 203 sends a timing signal to the vertical scanning unit 202, and the vertical scanning unit 202 generates control signals for actuating the pixels 201 based on the timing signal and actuates the pixels 201. The circuit control unit 204 controls the CLK generation circuit 205 and the signal readout unit 207 based on the timing signal from the TG 203. Further, the CLK generation circuit 205 generates a clock signal to be supplied to the signal readout unit 207 based on a clock signal supplied from the TG 203 and control by the circuit control unit 204.

FIG. 3 is a block diagram showing the configuration of each readout circuit 208 shown in FIG. 2.

The readout circuit 208 includes an analog-to-digital converter (ΔΣ ADC) 300 using ΔΣ modulation and a digital filter 301. The ΔΣ ADC 300 converts the pixel signal input via the column output line 206 into a digital signal using ΔΣ modulation. The digital filter 301 removes out-of-band quantization noise shifted to a higher frequency by the ΔΣ modulation. Also, the digital filter 301 reduces the output rate and/or converts the pixel signal into a multi-bit signal by thinning out and/or taking moving average of the high-rate output of the ΔΣ ADC 300.

FIG. 4 is a block diagram illustrating the configuration of the ΔΣ ADC 300 shown in FIG. 3.

As shown in FIG. 4, the ΔΣ ADC 300 consists of a subtraction circuit 400, an integration circuit 401, a comparator 402, and a digital-to-analog converter (DAC) 403.

The subtraction circuit 400 outputs the difference between the pixel signal input via the column output line 206 and the output signal of the DAC 403 to the integration circuit 401. Note that, as an embodiment of the disclosure, a configuration in which a sample-and-hold circuit is provided between the column output line 206 and the subtraction circuit 400 may be used. In that case, the pixel signal output from the sample-and-hold circuit is input to the subtraction circuit 400.

The integration circuit 401 has an integrator that integrates the input signal from the subtraction circuit 400. As the integration circuit 401, a general integration circuit such as a gm-C integration circuit using a transconductor or an RC integration circuit using an operational amplifier may be used.

The comparator 402 compares a reference voltage Vref with a voltage signal output from the integration circuit 401 in synchronization with the clock signal, and outputs the comparison result as a 1-bit digital signal. For example, when the voltage signal output from the integration circuit 401 is lower than the reference voltage Vref, 0 is output, and when it is equal to or higher than the reference voltage Vref, 1 is output. This digital signal is supplied to the digital filter 301 and the DAC 403.

The DAC 403 converts the digital signal output from the comparator 402 into a predetermined analog signal, and outputs it to the subtraction circuit 400. For example, when the digital signal output is 1, an analog signal with a predetermined level is output. Various kinds of circuits can be used as the configuration of the digital-to-analog conversion circuit.

FIG. 5 is a block diagram showing the configuration of the CLK generation circuit 205.

The CLK generation circuit 205 is composed of a frequency divider A 500, a Pulse-Locked Loop (PLL) 501, and a frequency divider B 502.

The frequency divider A 500 and the frequency divider B 502 have their division ratios controlled by the circuit control unit 204. The frequency divider A 500 divides the frequency of the clock $f_M$ given by the TG 203 by 1/M and inputs it to the PLL 501. The frequency divider B 502 divides the output of the PLL 501 by 1/N and inputs it to the PLL 501 again.

Since the PLL 501 multiplies the input clock so that the phases and frequencies of the inputs from the frequency divider A 500 and the frequency divider B 502 match, the output $f_{OS}$ of the PLL 501 is $f_M \times N/M$. Since $f_{OS}$ is the frequency of the clock signal supplied to the $\Delta\Sigma$ ADC 300, it is the operating frequency of the $\Delta\Sigma$ ADC 300, that is, the oversampling frequency.

FIGS. 6A to 6D show examples of input and output voltage waveforms of the comparator 402.

The voltage waveforms shown in FIGS. 6A to 6D exemplify part of the process of $\Delta\Sigma$ A/D converting pixel signals of the same level input to the $\Delta\Sigma$ ADC 300 via the column output line 206 at different oversampling frequencies. In practice, such a waveform pattern is repeated for a predetermined period of time.

Figure 6:
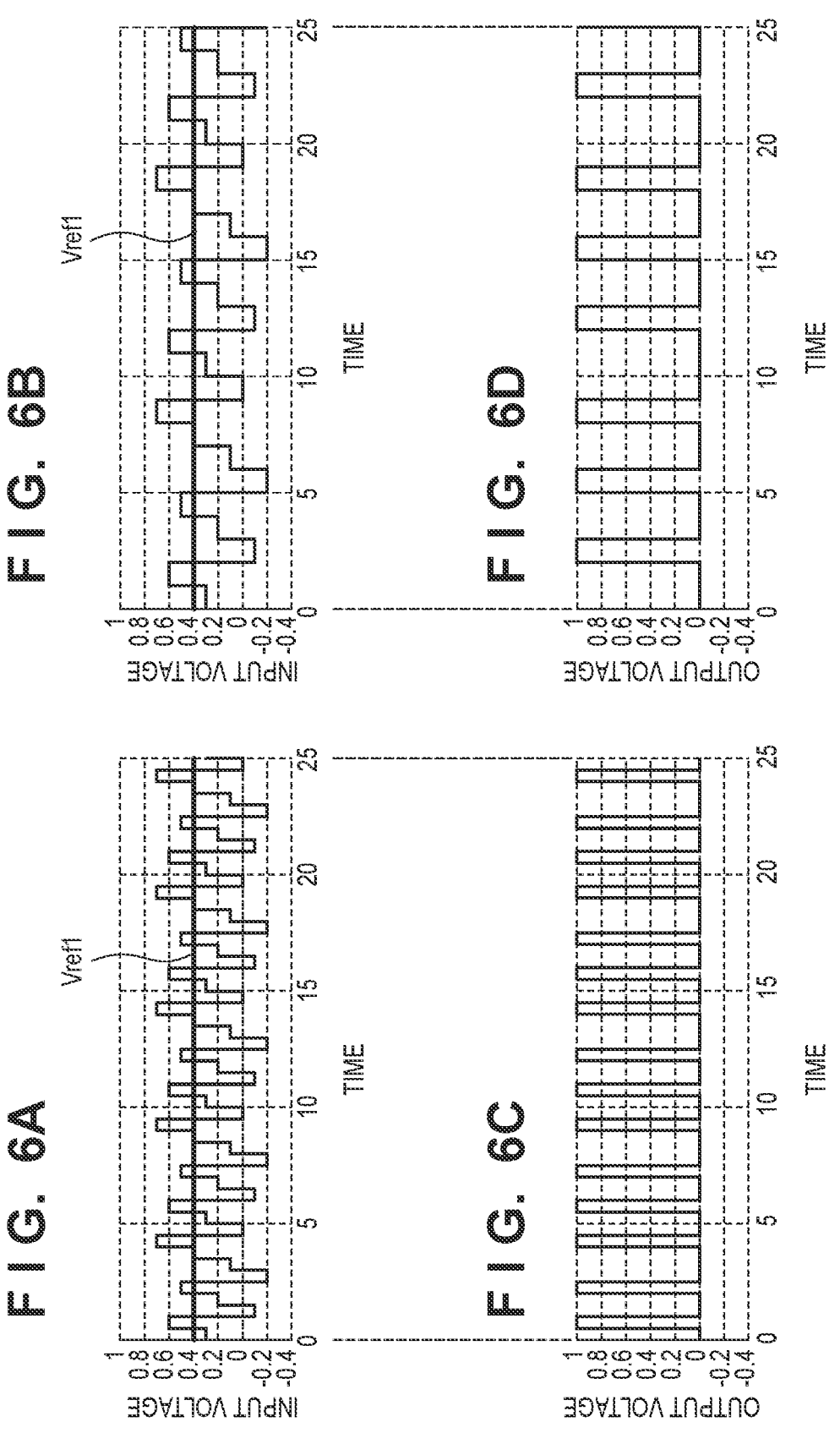
FIGS. 6A to 6D are diagrams showing examples of input voltage waveforms and output voltage waveforms of a comparator according to the first embodiment.

FIGS. 6A and 6B show voltage waveforms on the input terminal side, that is, the output voltage of the integration circuit 401 and the reference voltage. FIG. 6C is a $\Delta\Sigma$-modulated digital signal waveform on the output terminal side corresponding to FIG. 6A, and FIG. 6D is a $\Delta\Sigma$-modulated digital signal waveform on the output terminal side corresponding to FIG. 6B.

FIGS. 6A and 6C show an example in which the oversampling frequency is doubled with respect to FIGS. 6B and 6D, and one unit of time on the horizontal axis corresponds to one cycle of the clock in FIGS. 6A and 6C. Also, as shown in FIGS. 6A and 6B, the states of the $\Delta\Sigma$ ADCs 300 are the same at the start of the $\Delta\Sigma$ A/D conversion processing (immediately after each circuit is reset), the input voltages also become the same level via the subtraction circuit 400 and the integration circuit 401 at time 0. FIGS. 6A and 6B illustrate a case where this voltage is 0.3V.

In this case, the change in the voltage signal that occurs up to time 10 in the example shown in FIG. 6D occurs in half the time of FIG. 6D which is up to time 5 in the voltage signal shown in FIG. 6C where the oversampling frequency is doubled. That is, in a case where the $\Delta\Sigma$ A/D conversion is performed for the same time, doubling the oversampling frequency can approximately double the number of times the voltage signal changes.

Tables 1 and 2 shown below show the relationship between ISO sensitivity setting of the image capturing apparatus, oversampling rate (hereinafter referred to as "OSR"), which is the ratio between the Nyquist frequency and the oversampling frequency, and bit precision.

TABLE 1

| ISO | OSR | A/D BIT PRECISION | Dgain | OUTPUT BIT PRECISION |
|---|---|---|---|---|
| 100 | n | 14 | 1 | 14 |
| 200 | n | 14 | 2 | 13 |
| 400 | n | 14 | 4 | 12 |
| 800 | n | 14 | 8 | 11 |
| 1600 | n | 14 | 16 | 10 |

TABLE 2

| ISO | OSR | A/D BIT PRECISION | Dgain | OUTPUT BIT PRECISION |
|---|---|---|---|---|
| 100 | n | 14 | 1 | 14 |
| 200 | 2n | 15 | 2 | 14 |
| 400 | 4n | 16 | 4 | 14 |
| 800 | 8n | 17 | 8 | 14 |
| 1600 | 16n | 18 | 16 | 14 |

In Table 1, the OSR is n regardless of the ISO sensitivity, and the bit precision of A/D conversion including processing by a decimation filter is 14 bits at ISO100. At this time, it is necessary to apply a digital gain (Dgain) to raise the ISO sensitivity to ISO200, ISO400, etc. Therefore, the bit precision of the final output becomes 1/Dgain, and in the case of ISO1600, it becomes 10 bits. In this case, the resulting image is adversely affected by tone jumps, quantization noise multiplied by gain, and so forth.

In order to eliminate these effects, in this embodiment, as shown in Table 2, the OSR is changed according to the ISO sensitivity. For example, in ISO1600, by setting the OSR to 16*n*, the bit precision of A/D conversion becomes 18 bits, and even if multiplied by Dgain of 16, the bit precision of the final output becomes 14 bits. Also, by increasing the OSR, the effect of noise shaping is increased, and the quantization noise is reduced.

In the above example, the case where the OSR is determined according to the digital gain due to the ISO sensitivity has been described, but the OSR may be changed according to the digital gain resulting from various corrections such as peripheral illumination correction. For example, in a case where a lens with a large peripheral light falloff is attached and a digital gain is applied to the periphery of an image according to the image height in the peripheral light falloff correction, by changing the OSR according to the digital gain as shown in Table 2, it is possible to reduce tone jumps and noise in the periphery of the image even after the correction is applied.

As described above, according to the first embodiment, by changing the OSR according to the digital gain, it is possible to avoid the decrease in bit precision due to the digital gain, and an image from which tone jump and an increase in quantization noise are reduced can be obtained.

In the first embodiment, the first-order $\Delta\Sigma$ modulator constituting the first-order loop filter is used, but the disclosure can be applied to a circuit configuration that uses a second-order or higher-order $\Delta\Sigma$ modulator in order to stabilize the feedback loop. Also, in the incremental $\Delta\Sigma$ ADC, although the digital signal waveforms are different from those in FIGS. 6A to 6D, similar effects can be obtained by changing the OSR.

Second Embodiment

Next, a second embodiment of the disclosure will be described.

In the above-described first embodiment, the case where the OSR is changed according to the digital gain has been explained, but in the second embodiment, the case where the OSR is changed according to the shooting mode or the like will be explained. Note that the configuration of the image capturing apparatus according to the second embodiment is the same as that described with reference to FIGS. 1 to 5 in the first embodiment, so description thereof will be omitted.

Table 3 shows an example of the shooting modes in the second embodiment, and the relationship between OSR and bit accuracy.

TABLE 3

| MODE | OSR | A/D BIT PRECISION |
|---|---|---|
| High quality still image | $2n$ | 15 |
| Still image | $n$ | 14 |
| Log moving image | $4n$ | 16 |
| Moving image | $n/4$ | 12 |
| LV | $n/16$ | 10 |
| HLG | $4n$ | 16 |
| PQ | $8n$ | 17 |

In Table 3, the OSR in the still image mode is $n$ and the bit precision is 14 bits, and the OSR in the moving image mode is $n/4$ and the bit precision is 12 bits. The difference in bit precision between the still image mode and the moving image mode is due to restrictions on the data transfer rate from the image sensor 105 to the signal processing circuit 106, for example.

In a case where the high-quality still image mode is implemented as a mode capable of acquiring a good image with less noise than in the still image mode, an image with 15-bit accuracy is obtained by setting the OSR to $2n$.

In the live view (LV) mode, the image to be displayed on the display unit 111 is acquired without being recorded on the recording medium 110, so the image quality requirements are not high. Therefore, the OSR is set to low, $n/16$, for the purpose of reducing power consumption by reducing the amount of data.

Figure 7:
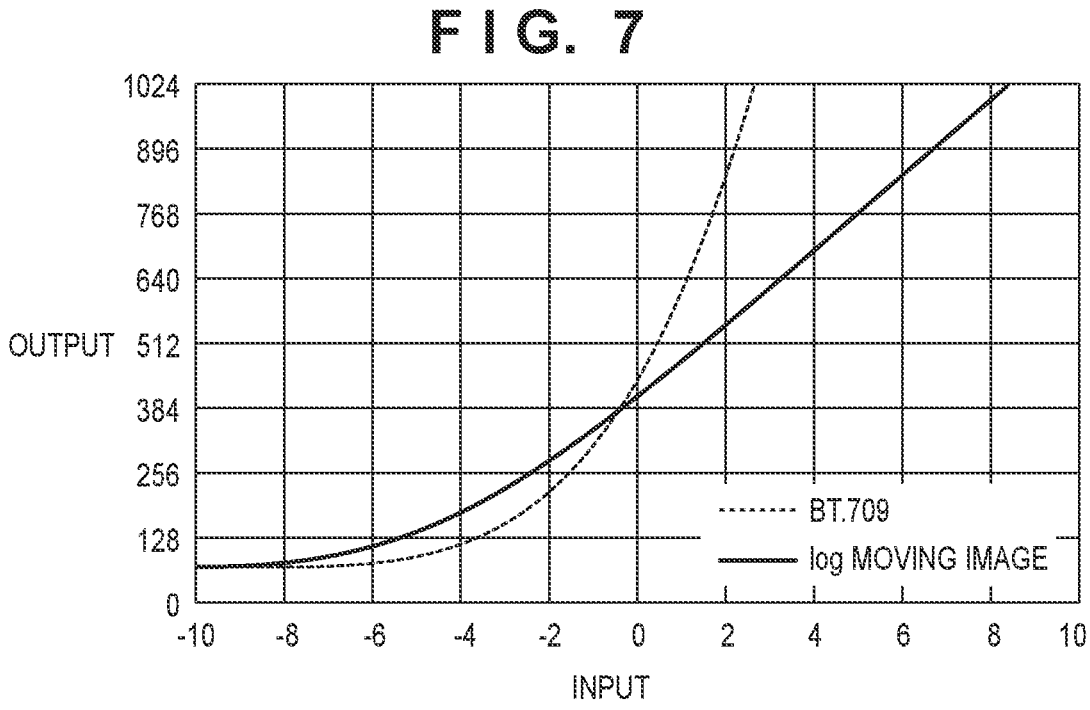
FIG. 7 is input/output characteristic diagrams of a non-log moving image and a log moving image according to a second embodiment.

On the other hand, in the Log moving image mode for obtaining a wide dynamic range, the OSR is increased to $4n$. A Log moving image have input/output characteristics as shown in FIG. 7, for example. The horizontal axis of FIG. 7 indicates the stop number for 18% gray, and the vertical axis indicates the signal level in the 10-bit recording file. A dashed line indicates the characteristics of the non-Log format, BT. 709, and a solid line indicates the characteristics of the Log moving image.

As shown in FIG. 7, in the Log moving image, the gradient of the dark portion is steep comparing to BT. 709, and thus, by allocating a large signal level to the dark portion, the gradation of the dark portion becomes rich. On the other hand, noise in the dark area is noticeable because it is in a state as if a high gain is applied.

Therefore, although the Log moving image will be recorded as a 10-bit moving image file, by increasing the OSR and reducing quantization noise through noise shaping, it is possible to reduce noise and improve gradation in dark areas.

Figure 8:
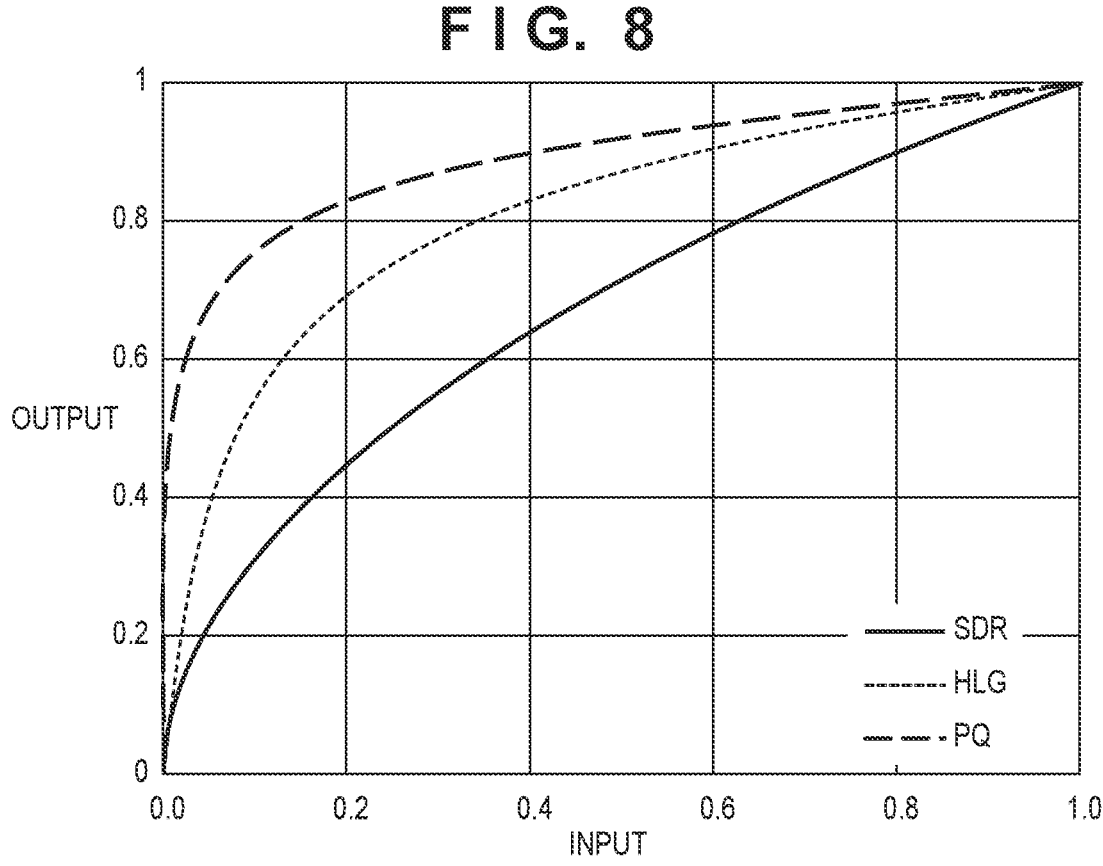
FIG. 8 is a diagram showing an example of a gamma curve in an SDR mode and PQ and HLG gamma curves in an HDR mode according to the second embodiment.

FIG. 8 shows a gamma curve in the Standard Dynamic Range (SDR) mode and gamma curves in the Perceptual Quantization (PQ) method and the Hybrid Log Gamma (HLG) method of the High Dynamic Range (HDR) mode. A solid line shows an example of an SDR gamma curve, a dotted line shows an example of an HLG gamma curve, and a dashed line shows an example of a PQ gamma curve. Unlike FIG. 7, the horizontal axis represents luminance.

As in the case of log moving images, by allocating more signal levels to dark areas in the HLG method than in the SDR mode, the gradation in the dark areas becomes richer, but the noise in the dark areas becomes more conspicuous. This tendency is even more pronounced in the PQ method. Therefore, by increasing the OSR and reducing the quantization noise by noise shaping, it is possible to reduce noise and improve gradation in dark areas.

As described above, according to the second embodiment, by changing the OSR according to the shooting mode, and the like, it is possible to obtain an image with image quality suitable for each shooting mode, and the like, and reduce power consumption.

Third Embodiment

Next, a third embodiment of the disclosure will be described.

In the third embodiment, an OSR switching control, which is a combination of the OSR switching control described in the first embodiment and the OSR switching control described in the second embodiment, will be described.

FIG. 9 is a flowchart showing the OSR switching control in this embodiment.

When the power of the image capturing apparatus is turned on, the set shooting conditions are acquired in step S901. In step S902, the OSR to be set is determined based on the combination of the ISO sensitivity and the shooting mode according to the obtained current shooting conditions. For example, in the case of ISO400 and moving image mode, the OSRs are $4n$ and $n/4$ from Tables 2 and 3, respectively, so the OSR to be set is $n$.

In step S903, it is determined whether the OSR obtained in step S902 can be set. In one embodiment, the OSR can be set without restrictions, but in reality, there are circuit setting limits for clock frequency division and multiplication. If the OSR is within the settable range, the determined OSR is set in step S904. If the OSR is equal to or less than the settable lower limit, the lower limit is set as the OSR in step S905. If the OSR is equal to or higher than the settable upper limit, the upper limit is set as the OSR in step S906.

In step S907, it is determined whether an instruction has been given to change the ISO sensitivity and/or the shooting mode that requires to change the OSR. If the OSR needs to be changed, the process returns to step S902, and the OSR is obtained again based on the changed ISO sensitivity and/or shooting mode.

If there is no change in ISO sensitivity and/or shooting mode that requires to change the OSR, it is determined in step S908 whether shooting is instructed by pressing the release button or the like. If there is no shooting instruction, the process returns to step S907.

On the other hand, if shooting is instructed, in step S909 moving image recording or still image shooting are performed, and after a signal is processed by the signal processing circuit 106, the obtained image data is held in the memory unit 107 and recorded on the recording medium 110 via the I/F unit 109, and the processing is ended.

As described above, according to the third embodiment, by switching the OSR according to the combination of ISO sensitivity and shooting mode, it is possible to obtain an image with image quality suitable for each combination as well as to reduce power consumption.

In the example shown in FIG. 9, the case where the OSR is changed according to the combination of the ISO sensitivity and the shooting mode has been described, but the disclosure is not limited to this. For example, the OSR may be changed based on various kinds of corrections such as peripheral illumination correction as described above.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-152806, filed Sep. 26, 2022, which is hereby incorporated by reference herein in its entirety.

What is claimed is:

1. An analog-to-digital converter comprising:
one or more processors and/or circuitry which function as:
an analog-to-digital conversion unit that performs analog-to-digital conversion using ΔΣ modulation on an image signal output from pixels;
a setting unit that sets an operating frequency of the analog-to-digital conversion unit; and
a generation unit that generates a clock signal having the operating frequency and supplies it to the analog-to-digital conversion unit,
wherein the setting unit sets the operating frequency based on at least one of a digital gain to be applied to the signal output from the analog-to-digital conversion unit and a shooting mode so that bit precision of a signal obtained by applying a digital gain to the image signal which has undergone the analog-to-digital conversion by the analog-to-digital conversion unit is constant regardless of magnitude of the digital gain.

2. The analog-to-digital converter according to claim 1, wherein the generation unit divides and multiplies a frequency of a predetermined clock signal to generate the clock signal having the operating frequency.

3. The analog-to-digital converter according to claim 1, wherein, given that a predetermined digital gain is M, the setting unit obtains the operating frequency by multiplying a predetermined frequency by M/N in a case where the digital gain to be applied to the image signal is N.

4. The analog-to-digital converter according to claim 3, wherein the digital gain is determined based on at least one of ISO sensitivity and a correction method including peripheral illumination correction.

5. A sensor comprising:
a plurality of pixels; and
an analog-to-digital converter comprising one or more processors and/or circuitry which function as:
an analog-to-digital conversion unit that performs analog-to-digital conversion using ΔΣ modulation on an image signal output from the pixels;
a setting unit that sets an operating frequency of the analog-to-digital conversion unit; and
a generation unit that generates a clock signal having the operating frequency and supplies it to the analog-to-digital conversion unit, and
wherein the setting unit sets the operating frequency based on at least one of a digital gain to be applied to the signal output from the analog-to-digital conversion unit and a shooting mode so that bit precision of a signal obtained by applying a digital gain to the image signal which has undergone the analog-to-digital conversion by the analog-to-digital conversion unit is constant regardless of magnitude of the digital gain.

6. The sensor according to claim 5, wherein the generation unit divides and multiplies a frequency of a predetermined clock signal to generate the clock signal having the operating frequency.

7. The sensor according to claim 5, wherein, given that a predetermined digital gain is M, the setting unit, in the analog-to-digital converter, obtains the operating frequency by multiplying a predetermined frequency by M/N in a case where the digital gain to be applied to the image signal is N.

8. The sensor according to claim 5, wherein, in the analog-to-digital converter, the digital gain is determined based on at least one of ISO sensitivity and a correction method including peripheral illumination correction.

9. An apparatus comprising:
a sensor that includes:
a plurality of pixels; and
an analog-to-digital converter comprising one or more processors and/or circuitry which function as:
an analog-to-digital conversion unit that performs analog-to-digital conversion using ΔΣ modulation on an image signal output from the pixels;
a setting unit that sets an operating frequency of the analog-to-digital conversion unit; and
a generation unit that generates a clock signal having the operating frequency and supplies it to the analog-to-digital conversion unit; and
a signal processing unit that processes the image signal converted by the analog-to-digital converter,
wherein the setting unit sets the operating frequency based on at least one of a digital gain to be applied to the signal output from the analog-to-digital conversion unit and a shooting mode so that bit precision of a signal obtained by applying a digital gain to the image signal which has undergone the analog-to-digital conversion by the analog-to-digital conversion unit is constant regardless of magnitude of the digital gain.

10. The apparatus according to claim 9, wherein the generation unit divides and multiplies a frequency of a predetermined clock signal to generate the clock signal having the operating frequency.

11. The apparatus according to claim 9, wherein, given that a predetermined digital gain is M, the setting unit, in the analog-to-digital converter, obtains the operating frequency by multiplying a predetermined frequency by M/N in a case where the digital gain to be applied to the image signal is N.

12. The apparatus according to claim 9, wherein, in the analog-to-digital converter, the digital gain is determined based on at least one of ISO sensitivity and a correction method including peripheral illumination correction.

* * * * *